March 15, 1960 — I. Z. MARTIN — 2,928,211
HYDROPONIC APPARATUS
Filed May 7, 1958 — 8 Sheets-Sheet 1

INVENTOR.
IVAN Z. MARTIN
BY
ATTORNEYS

INVENTOR.
IVAN Z. MARTIN
BY
Marechal, Biebel, French & Bugg
ATTORNEYS

March 15, 1960     I. Z. MARTIN     2,928,211
HYDROPONIC APPARATUS

Filed May 7, 1958     8 Sheets-Sheet 3

INVENTOR.
IVAN Z. MARTIN
BY
*Manchal, Biebel, French & Bugg*
ATTORNEYS

March 15, 1960     I. Z. MARTIN     2,928,211
HYDROPONIC APPARATUS Filed May 7, 1958     8 Sheets-Sheet 7

INVENTOR.
IVAN Z. MARTIN
BY
Marechal, Biebel, French & Bugg
ATTORNEYS

March 15, 1960     I. Z. MARTIN     2,928,211
HYDROPONIC APPARATUS Filed May 7, 1958     8 Sheets-Sheet 8

INVENTOR.
IVAN Z. MARTIN
BY
ATTORNEYS

United States Patent Office 2,928,211
Patented Mar. 15, 1960

2,928,211

HYDROPONIC APPARATUS

Ivan Z. Martin, Springfield, Ohio

Application May 7, 1958, Serial No. 733,657

11 Claims. (Cl. 47—1.2)

This invention relates to apparatus for the soilless germination of seed and growth of grass and other plant material therefrom.

The germination and growth of seed in chemical solutions in the absence of soil, known as hydroponics, particularly to grow various types of grass and other forage material, offers important advantages in providing fresh green feed for livestock and other farm animals during the seasons of the year when they would not otherwise normally be available. Thus livestock grazing is reduced or impossible during winter months in many regions, and sometimes similar conditions exist during prolonged dry spells in the summer and fall. Great benefits would result to the stock and therefore to the farmer if during such periods it were possible to have a simple and economical source of fresh green plant material, particularly as a conditioning or supplement food, and the present invention is directed generally to this basic objective.

It is a primary object of the invention to provide simple and efficient apparatus of novel construction for the hydroponic production of fresh green forage materials which incorporates multiple tiers of trays for growing plant material, which will function efficiently independently of outdoor weather conditions, and which will therefore serve as a source of such forage materials when they are normally not otherwise available.

Another object of the invention is to provide hydroponic seed germinating and growing apparatus as outlined above which incorporates means for supplying selectively heated or cooled air to the growing plants to maintain substantially constant surrounding temperature conditions.

An additional object of the invention is to provide hydroponic apparatus as outlined above which incorporates an improved spraying system for supplying nutrient liquid to the growing plant material at desired intervals and which at the same time offers maximum assurance against over-wetting of the growing seeds and similar conditions which might cause mold or other disadvantageous effects.

A further object of the invention is to provide hydroponic apparatus as outlined above wherein a framework supports the multiple tiers of trays of growing plant material and also incorporates as a part thereof the drainage system for receiving unabsorbed liquid from the individual trays and delivering such liquid to the supply reservoir from which it can subsequently be recirculated to the trays during the next irrigating cycle.

It is also an object of the invention to provide hydroponic apparatus as outlined above which is particularly adapted for production in a variety of sizes for different output capacities, and particularly to provide such apparatus which is capable of production in unit form adapted for combination to form multiple unit assemblies.

Other objects and advantages of the invention will be apparent from the following description, the accompanying drawings and the appended claims.

Referring to the drawings, which illustrate preferred embodiments of the invention, the apparatus of Figs. 1–14 is incorporated in a cabinet 25 of suitable heat insulating wall structure shown as comprising a plurality of vertically and horizontally arranged angles 30 and 31 in cooperation with suitable structural panels 33 of insulating material and a metal or other waterproof inner liner 34. Similar panels 33 may be employed in the roof structure, and the bottom of the cabinet includes a pan 35 which also forms the reservoir for the liquid for watering the growing plant material within the cabinet. The base structure of the cabinet includes angle rails 36 to which are attached suitable leveling feet 37, it being intended generally that this cabinet be located indoors in a barn or similar building, and the cabinet is shown as provided with a pair of hinged doors 38 at the front thereof.

Figures 2, 3:
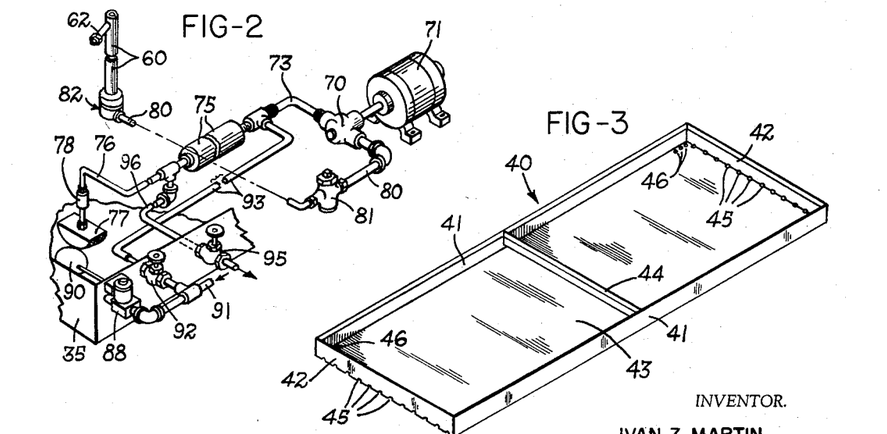
Fig. 2 is a diagrammatic perspective view of the liquid supply system in the apparatus of Fig. 1.
Fig. 3 is a perspective view of one of the trays incorporated in the apparatus of Fig. 1.

The seed and growing plant material within the cabinet 25 is contained within a plurality of trays 40, one of which is shown in detail in Fig. 3. It is of rectangular shape including side walls 41, end walls 42 and a bottom wall 43, and a cross brace 44 may be mounted as shown across the middle thereof in slightly raised relation with the bottom wall 43 to permit liquid to flow thereunder lengthwise of the tray. A plurality of drain holes 45 are provided along the junction of the bottom and end walls 42 and 43, and a few additional drain holes 46 preferably extend a slight distance from each corner along the junction between the side and end walls of the tray.

Figure 4:
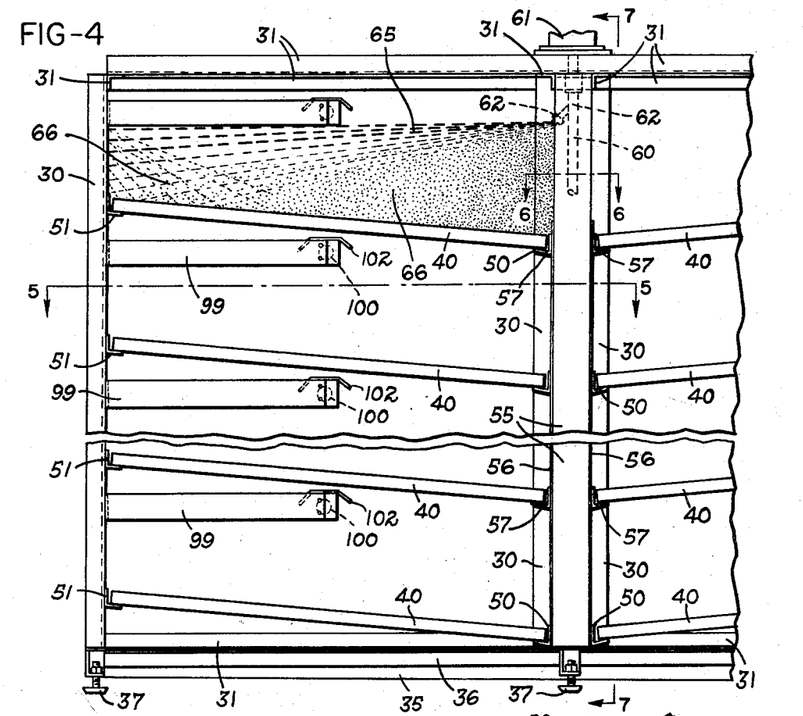
Fig. 4 is a fragmentary view in front elevation of the apparatus of Fig. 1 with the access doors removed.
Figure 5:
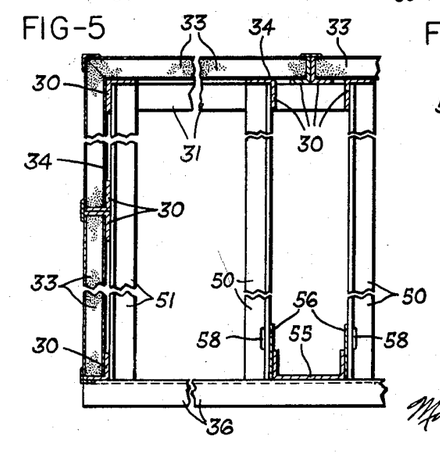
Fig. 5 is a fragmentary section on the line 5—5 of Fig. 4.
Figure 6:
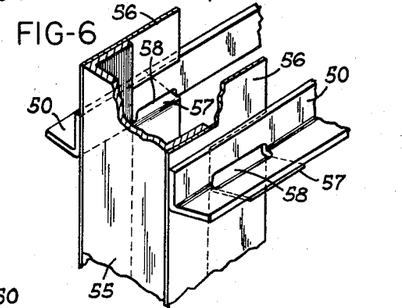
Fig. 6 is an enlarged fragmentary detail view in perspective taken generally as indicated by the line 6—6 of Fig. 4.

The structure for supporting the trays 40 within the cabinet 25 includes a framework composed of certain of the vertical angles 30 and a plurality of generally horizontally arranged angles 50 and 51. The angles 50 and 51 are arranged in pairs but with the angles 51 along the outside wall of the cabinet being at a higher level than their associated angles 50 to provide for supporting the trays 40 in inclined relation toward the center of the cabinet as shown in Fig. 4. The angles 51 are accordingly opened slightly beyond 90°, and the angles 50 are similarly closed to an angle sufficiently less than 90° to provide a trough effect, satisfactory results having been obtained with this angle approximately 80° as shown.

When this apparatus is in operation, it is intended that whenever liquid is supplied to the several trays 40, it should drain lengthwise of the trays to the angles 50 and thence return to the reservoir pan 35. The angles 50 and 51 are therefore not truly horizontal but are inclined toward the front of the cabinet at a small angle. In addition, the supporting framework includes a channel 55 located in the center of the front of the cabinet to which the forward ends of the angles 50 are secured. As shown particularly in Fig. 6, the sides of the channel 55 are effectively extended by sheet metal panels 56, and a tab portion 57 of each of these panels is bent out below each angle 50 to provide a slot connecting the interior of the channel 55 with a slot 58 cut in the center of each angle 50. Thus liquid draining from a tray 40 to one of the angles 50 will run along the interior of this angle to the front of the cabinet until it reaches the slot 58, and it will drain through this slot and the interior of the channel structure 55—56 to the reservoir pan 35.

Figure 9:
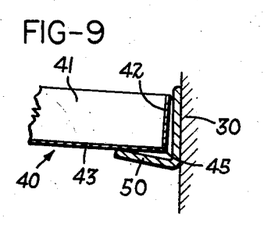
Fig. 9 is an enlarged fragmentary section on the line 9—9 of Fig. 7.
Figure 10:
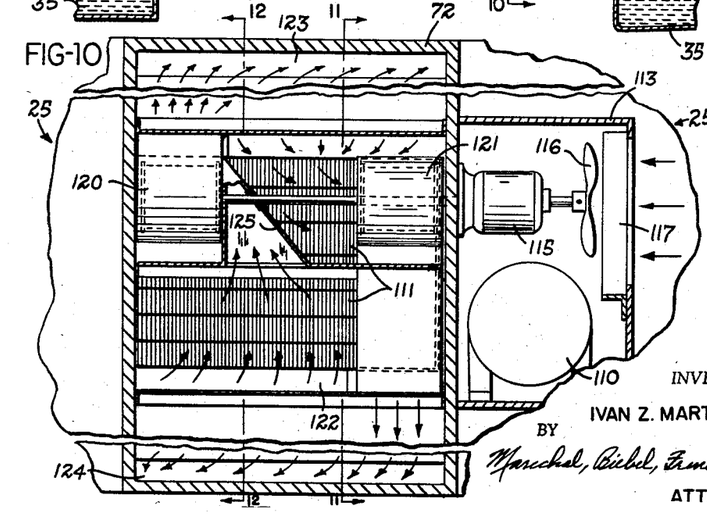
Fig. 10 is a view taken as indicated by the line 10—10 of Fig. 12 and showing the air circulating and conditioning mechanism in the apparatus of Fig. 1.
Figure 11:
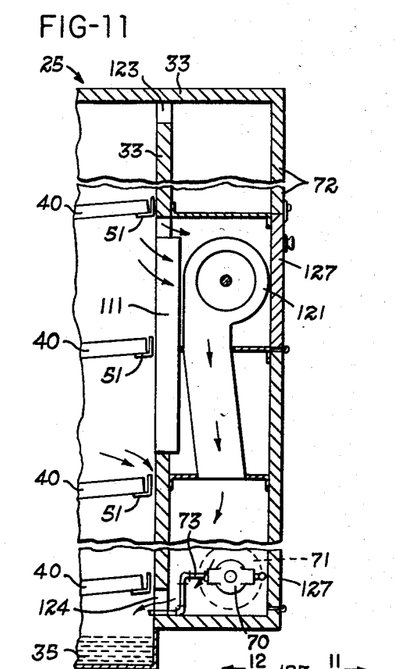
Figs. 11 and 12 are sections on the lines 11—11 and 12—12 respectively of Fig. 10.
Figure 12:
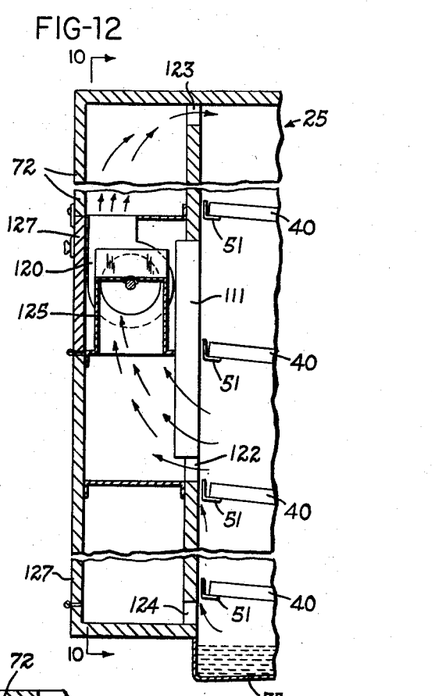
Figure 13:
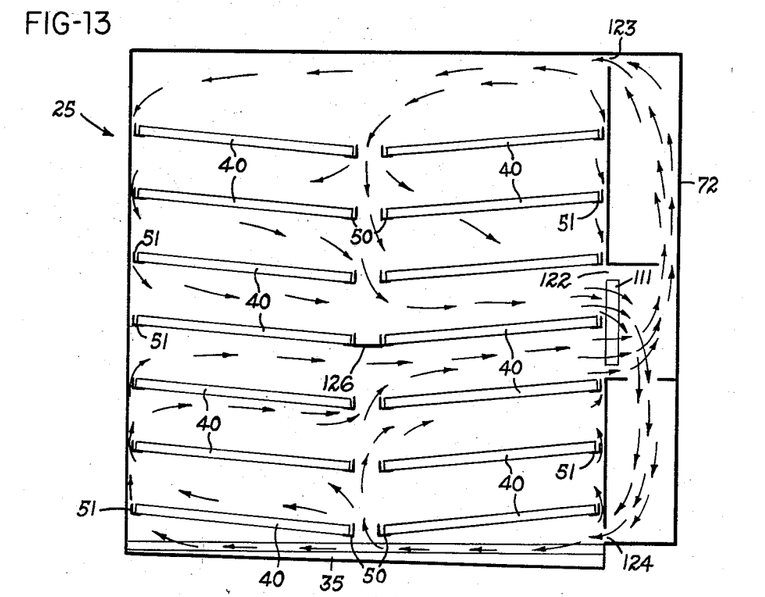
Fig. 13 is a diagrammatic view looking in the same direction as Fig. 4 and illustrating the pattern of air circulation in the apparatus of Fig. 1.

As best seen in Fig. 9, the relatively vertical spacings of the angles 50 and 51 and the angle defined by the two sides of each angle 50 is such that the adjacent end of the associated tray 40 will not seat fully in the angle but will rather rest on the upper edge of the outwardly extending side. This arrangement provides increased flow area through the resulting trough within the angle 50 to minimize the possibility of water overflowing laterally therefrom. In addition, the drain holes 46 extend along the side of the tray sufficiently close to the area of contact between the tray and the angle 50 to allow the water to drain in a steady stream by simultaneous contact with the tray and the angle rather than simply to drop from the end holes 45. It will of course be apparent that the provision of drain holes at both ends of each tray 40 allows the tray to be put in from either side thereof, but drainage will take place only from the lower end.

Figure 7:
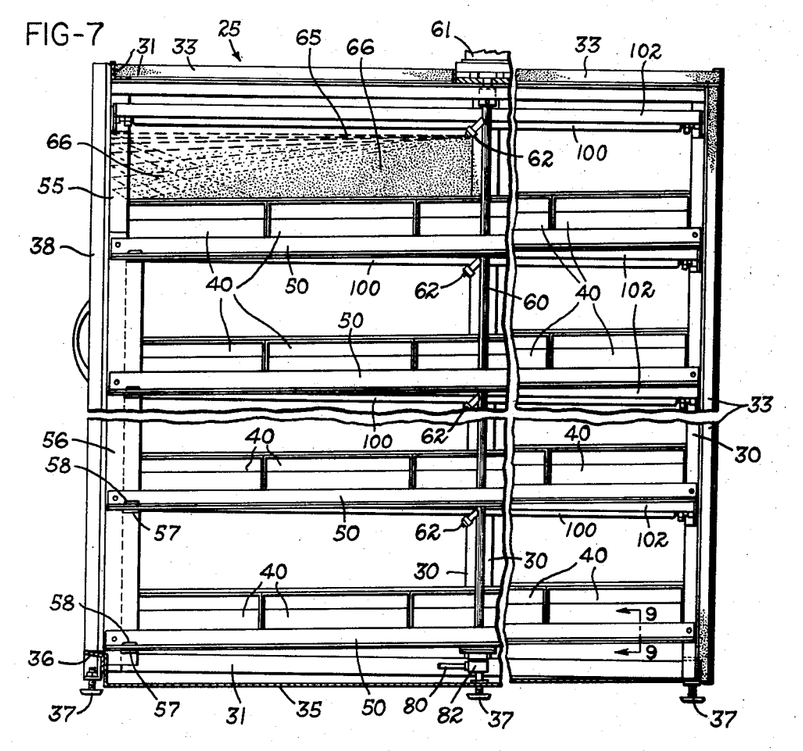
Fig. 7 is a fragmentary section taken as indicated by the line 7—7 of Fig. 4.

Provision is made for supplying liquid, water to which a nutrient salt is added from time to time, to all of the trays 40 simultaneously at predetermined desired intervals. Referring particularly to Fig. 7, a liquid supply pipe 60 is supported for rotation in the center of the cabinet and is provided with a drive motor 61 mounted on the top of the cabinet. The pipe 60 is provided with a spray nozzle 62 located above each of the levels of each tier of trays 40, and the nozzles 62 are constructed and arranged to provide a particular desired spray pattern which is illustrated in Figs. 4 and 7. More specifically, each of the nozzles 62 is of such characteristics that it will discharge a spray primarily in a horizontal plane as indicated by the heavy dash lines 65 in Figs. 4 and 7, accompanied by a considerably finer spray in generally downward directions as indicated by the stippling and lighter dash lines at 66 in Figs. 4 and 7. Satisfactory results from this standpoint have been obtained with a nozzle constructed in accordance with Wahlin Patent 2,619,388, issued November 25, 1952.

The spray pattern obtained with the above nozzle arrangement provides effective coverage of the entire area of each of the trays 40 without permitting any high velocity jets to strike either the seed or the growing plants therein. Thus the high velocity liquid is so directed that it will strike the wall of the cabinet above the adjacent trays 40 and bounce back onto the surface of the tray to assure effective watering of even the most remote areas of the trays, while at the same time the fine lower spray pattern will effectively cover the nearer areas of the trays. It has also been found desirable to provide each of the nozzles 62 below the uppermost one thereof with a check valve to prevent dripping after the liquid supply thereto is shut off.

Figure 1:
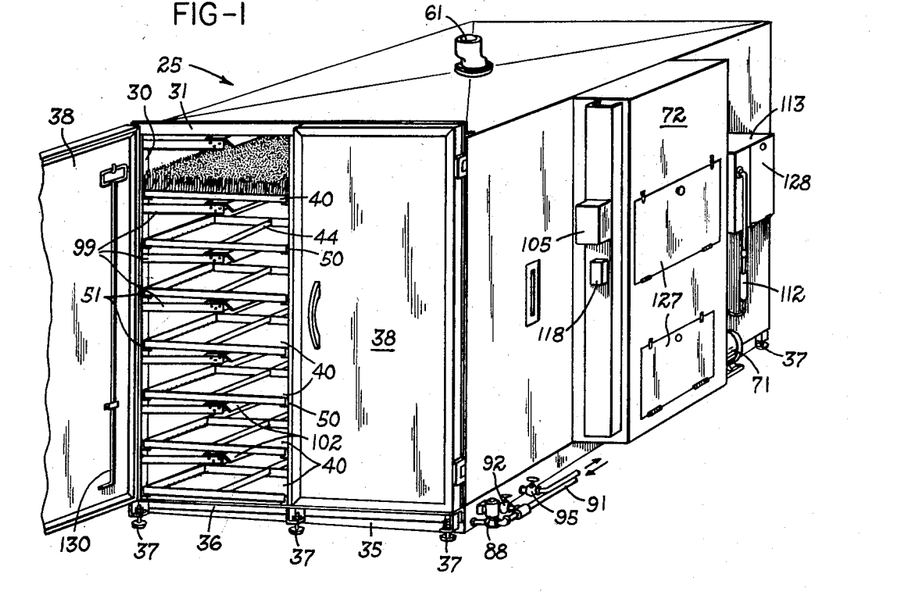
Fig. 1 is a perspective view showing hydroponic apparatus constructed in accordance with the invention and with one of the access doors open.

The liquid supply system for the cabinet 25 is shown as entirely automatic. Referring particularly to Fig. 2, the supply system includes a pump 70 and drive motor 71 located at the bottom of the supplemental cabinet 72 which is mounted as shown in Fig. 1 at one side of the main cabinet to house the majority of the mechanical components of the apparatus. The inlet line 73 for the pump 70 incorporates a filter 75, and the supply line 76 to this filter is provided with a strainer 77 which lies within the supply reservoir pan 35. The connection between the line 76 and strainer 77 preferably includes a foot valve 78 to maintain the lines full when the pump is shut off. The discharge line 80 from the pump 70 incorporates a relief valve 81 and connects with the bottom end of the nozzle supply pipe 60 through a rotary coupling 82.

Figure 14:
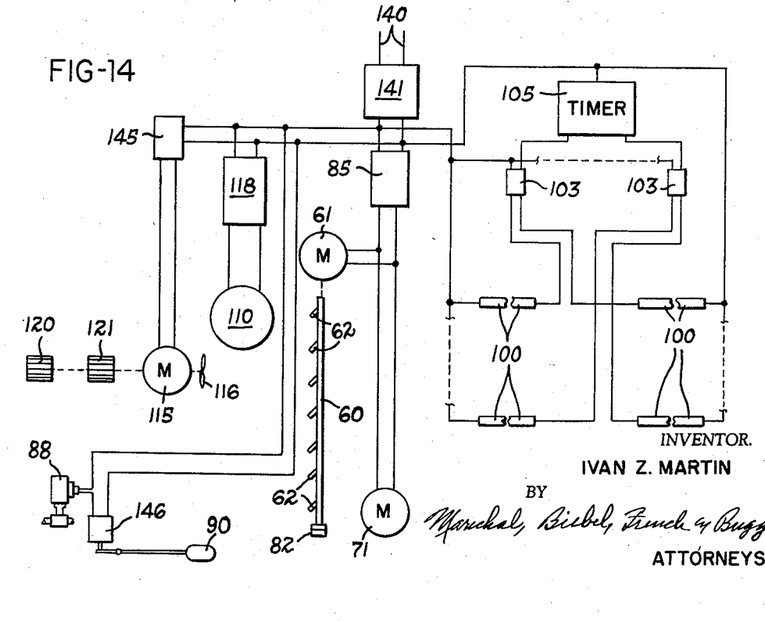
Fig. 14 is a wiring diagram for the apparatus of Fig. 1.

In normal operation, the motors 61 and 71 are operated periodically to supply liquid from the supply tank 35 to the nozzles 62, as is indicated by the time clock 85 in the wiring diagram of Fig. 14. In addition, provision is made for automatically replenishing the liquid supply in the tank 35 whenever the total therein drops below a predetermined level. As shown in Fig. 2, a supply valve 88 is mounted on the outer wall of the tank 35 and is controlled by a float 90. The valve 88 is connected directly with a water supply line 91 so that whenever the float 90 drops below the desired level, additional water is admitted to the pan 35, and while the valve 88 could be of a mechanical type, it is shown in Fig. 14 as solenoid-operated.

Provision is also made for back-washing the line filter 75 whenever this seems desirable. Referring again to Fig. 2, a manually operated valve 92 connects the supply line 91 to a line 93 connecting with the line 73 between the pump 70 and filter 75. Another manually operated valve 95 controls a connection 96 leading from the line 76 to drain. In order to back-wash the filter, therefore, it is merely necessary to open the valves 92 and 95, which will admit line pressure on the normally downstream side of the filter for back-washing and discharge to drain by way of the valve 95. During such operation, the foot valve 78 will prevent the back-wash water from reaching the tank 35.

Figure 8:
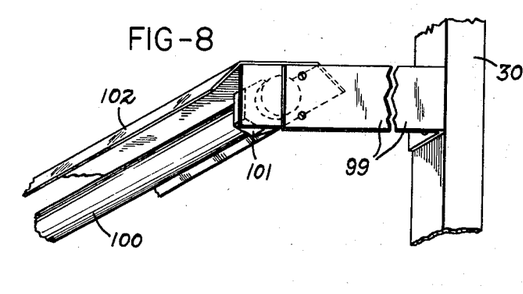
Fig. 8 is an enlarged fragmentary perspective view illustrating the mounting of one of the lighting tubes in the apparatus of Figs. 1–7.

Provision is made in accordance with the invention for supplying light to the growing plant materials in the trays 40, which is particularly desirable in the case of grain to be grown as green feed for cows and other such livestock. Referring particularly to Figs. 4 and 8, a pair of bracket arms 99 project outwardly from each of the corner angles 30 for supporting a fluorescent tube 100 in suitable waterproof sockets 101. A reflecting shade 102 is also supported by each pair of bracket arms 99 above the associated tube 100. The supply lines for the tubes 100 are shown in Fig. 14 as including the proper ballasts 103 and also a control timer 105 as described hereinafter in more detail in connection with the operation of the apparatus as a whole.

Preferred results are obtained with the apparatus of the invention if optimum temperature conditions are maintained within the cabinet at all times, and provision is accordingly made for assuring proper circulation of heated or cooled air throughout the cabinet as required to maintain such conditions. The air control system preferably includes a heat pump of any suitable conventional construction, and certain of the components of such unit are indicated in the drawings, including the compressor 110, which is shown as incorporating its own drive motor, heat exchanger 111, and expansion valve 112. The heat exchanger 111 is shown as housed centrally in the supplemental cabinet 72, and the compressor 110 is located in a further housing 113 forming an extension of the supplemental cabinet 72. A motor 115 in housing 113 drives a propeller fan 116 to draw in cooling air for the compressor 110 through an inlet 117 in the end wall of the housing 113.

An appropriate thermostatic control 118 (Figs. 1 and 14) operates the heat pump in accordance with prevailing temperature conditions to provide either a heating or cooling effect at the heat exchanger 111, and blowers 120 and 121 are mounted in the supplemental cabinet 72 to circulate air over the heat exchanger and through the cabinet. These blowers are shown as also driven by the motor 115, and they are arranged to discharge upwardly and downwardly respectively in the supplemental cabinet 72.

Figs. 10-13 illustrate the pattern of air circulation provided by this blower arrangement. The heat exchanger 111 is supported partially within an opening 122 in the wall of the main cabinet, and the air which reaches the blower 120 after passing through the heat exchanger is directed upwardly to enter the top of the main cabinet through the slot 123 for circulation generally around the trays 40 in the upper half of the cabinet until it returns to the opening 122. This air then again passes over portions of the heat exchanger 111 and enters the inlet of the blower 121, whence it is discharged downwardly into the bottom of the main cabinet through the slot 124 for circulation around the lower tiers of trays therein before once again returning to the heat exchanger 111. A baffle 125 controls the inlet flow to the two blowers as shown, and preferably a divider strip 126 (Fig. 13) is mounted between a pair of angles 50 in the middle portion of the cabinet to aid in this desired directional flow of the air. Access doors 127 and 128 may be provided as desired on the cabinet 72 and housing 113.

The overall proportions of this apparatus are readily determined in accordance with the desired production capacity. For example, each of the trays 40 is preferably made of a size which will be of a convenient maximum weight when the plant material therein has reached full growth, and it also facilitates use of the apparatus if each tray is of such size as to provide a correlation between its contents and the livestock to be fed therewith, for example one tray or one-half tray to each cow. A convenient size for this purpose has been found to be approximately 1 foot by 3 feet and 1 inch deep. This size of tray has the further advantage that it is effectively self-measuring in that the preferred charge of fresh seed is obtained when it is filled level with seed, as may be readily done by dumping an excess amount of seed therein and simply drawing a scraper along the top edge thereof.

The size of the cabinet as a whole should be correlated with the total desired number of trays, and a plurality of trays can be mounted in each tier. If the cabinet is constructed as shown with no provision for entry by the operator bodily within the cabinet, the trays can be loaded and unloaded in place by simple mechanical tools, such as the hook 130 shown in Fig. 1 mounted on one of the cabinet doors 38. The arrangement of two sets of tiers in laterally spaced relation as shown is efficient as providing for central mounting of the nozzle pipe 60 for complete coverage of all tiers with the discharge from the nozzles 62 as the pipe 60 rotates. It will be apparent, however, that determination of these matters depend to a considerable extent upon practical consideration.

It is as a general rule more efficient to have the cabinet of sufficient size to contain a substantial number of trays and tiers, since this facilitates progressive control of the growth in the several tiers such that a constant supply of plant material will be available over a variety of stages of growth. More specifically, it has been found with the apparatus constructed as described to provide closely regulated control over the conditions of heat, temperature and light, that with a seed such as oats, adequate growth will be obtained in seven days from the time the seed is first placed in the cabinet. It is for this reason that the cabinet is shown in the drawings as constructed to contain seven tiers, since this will provide for having one tier reach the desired maximum growth each successive day. It has also been found that it is unnecessary to illuminate the seed and growing material during the first three or four days after the seed is placed in the cabinet, and it is therefore desirable to employ a time-clock 105 for controlling the lights 100 which will operate the lights in each tier only during the proper three or four days in each week in accordance with the state of growth of the plant material in the respective tiers.

The interrelated automatic operation of the component parts of the control system of the apparatus is further illustrated by the wiring diagram in Fig. 14. The main power leads 140 connect with the fuse box 141, and the nozzle pipe motor 61 and pump motor 71 are connected in parallel through their own timer 85, satisfactory results having been obtained with this timer set to supply water to the tiers over a period of four minutes in each hour. The thermostatic control 118 for the heat pump is energized continuously, and similarly the blower motor 115 is controlled by a manual switch 145 which will normally be maintained closed to cause continuous air circulation. The lights 100 are separately controlled from the main circuit by the timer 105 as already described, and the solenoid valve 88 is similarly shown as connected for operation at any time as determined by its float controlled switch 146.

Figs. 15-23 show another cabinet construction in accordance with the invention, which has special applicability to units of smaller size as well as units which can be provided with a suspended mounting rather than standing on a floor. The general construction of this cabinet 160 is similar to that of the cabinet 25, and it includes a frame formed of structural members shown as vertically extending channels 161 and straps 162, and horizontally extending angles 163. A reservoir pan 165 forms the bottom of the cabinet, and the remaining walls are shown as formed of either insulating panels 166 or metal plates 167. A door 168 is hinged on the front of the cabinet and is shown as provided with magnetic latches 169.

Figure 17:
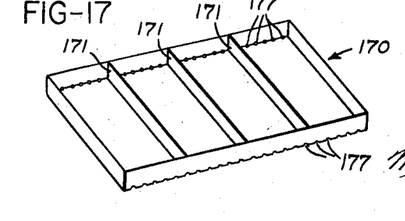
Fig. 17 is a perspective view of one of the trays incorporated in the apparatus of Figs. 15–16.
Figure 18:
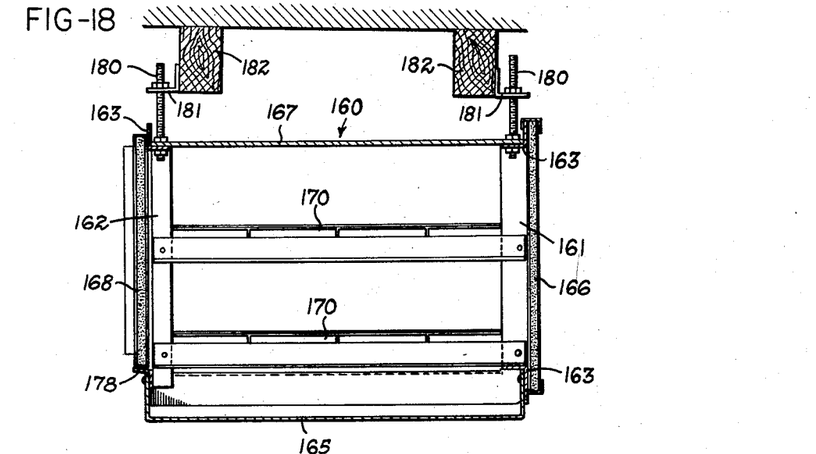
Fig. 18 is a vertical section on the line 18—18 of Fig. 15.

The growing material within the cabinet 160 is shown as contained in a plurality of trays 170 which are generally similar to the trays 40 but include a plurality of divider strips 171. This arrangement is particularly convenient when the cabinet 160 is used for growing plant material as feed for poultry, since it facilitates division of the contents of each tray into a plurality of readily handleable sections. The supporting structure for the trays 170 includes spaced angles 175 and 176 arranged at different levels similarly to the angles 150 and 151, and the cabinet 160 is proportioned to receive the trays 170 with their shorter ends extending across the front of the cabinet, so that the drainage holes 177 are provided along the long sides of each tray as shown in Fig. 17. The angles 175 and 176 are also inclined toward the front of the cabinet similarly to the angles 50 and 51, and they may be provided with drainage slots as already described in connection with the angles 50 in cabinet 25 to return unabsorbed liquid to the pan 165, or the liquid may simply drain over the lower ends of these angles to the pan 165. This result is aided by the arrangement of the angle 178 which forms the sill for door 168, and which as shown in Fig. 18 is tilted upwardly to direct dripping liquid to the pan 165.

Figure 16:
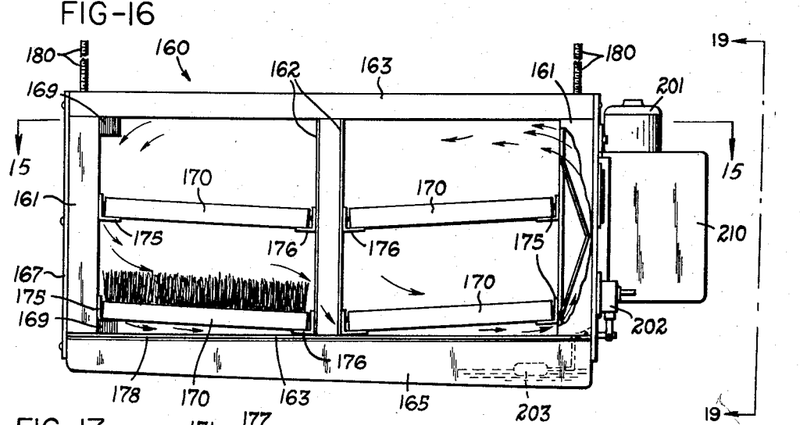
Fig. 16 is a front elevational view of the apparatus of Fig. 15 with the doors removed.

Since as noted, the cabinet 160 is intended to be constructed in relatively small unit sizes, it may conveniently be provided with a suspended mounting rather than constructed on a base. This arrangement is shown in Figs. 16 and 18, wherein the cabinet is suspended by bolts 180 from brackets 181 secured to the overhead beams 182. It will be apparent, however, that this cabinet could be provided with feet similar to the feet 37 for the cabinet 25.

Figure 15:
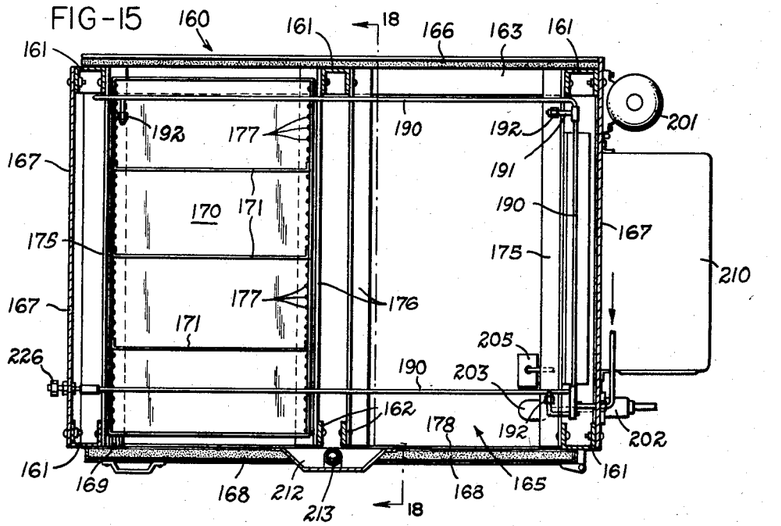
Fig. 15 is a plan section taken as indicated by the line 15—15 of Fig. 16 and illustrating another form of apparatus constructed in accordance with the invention, particularly for suspension from an overhead support.
Figure 22:
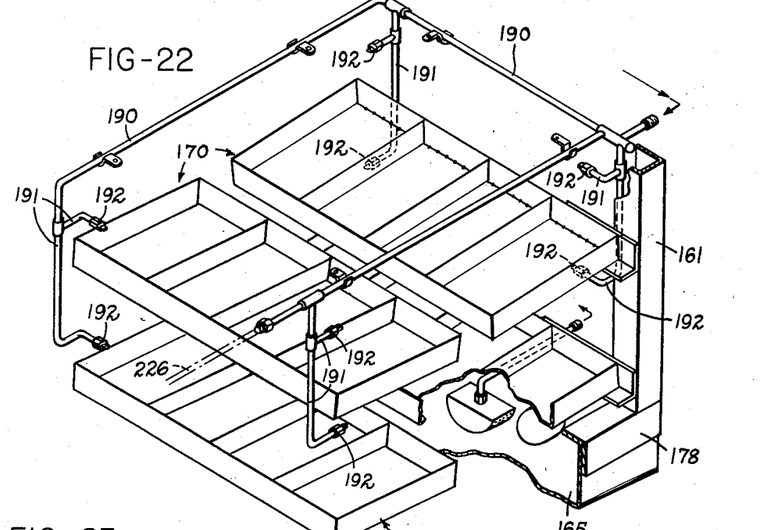
Fig. 22 is a diagrammatic perspective view illustrating the liquid supply system in the apparatus of Figs. 15–19.
Figure 23:
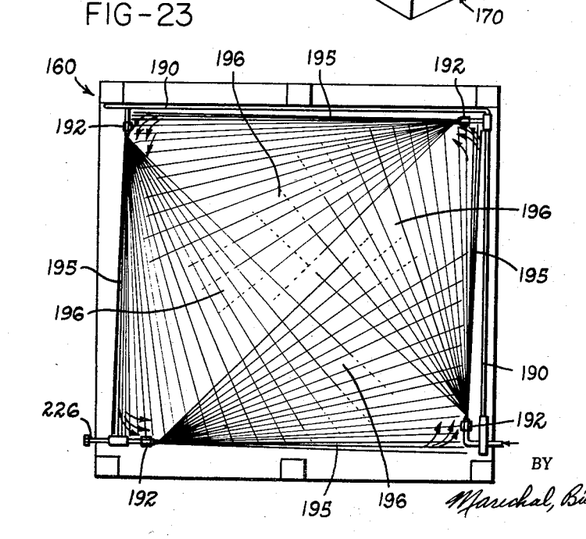
Fig. 23 is a diagrammatic plan view illustrating the pattern of liquid spray produced by the supply system of Fig. 22 in the apparatus of Figs. 16–19.

The cabinet 160 is provided internally with a somewhat different arrangement of piping and spray nozzles for irrigating the growing plant material from the liquid supply in pan 165. Referring particularly to Figs. 15 and 22 and 23, supply pipes 190 extend around the interior of the cabinet and are provided with sufficient branch pipes 191 to permit the mounting of a spray nozzle 192 above each corner of each tier of trays within the cabinet. The nozzles 192 may be similar to the nozzles 62 but are arranged in such manner that they direct the major part of their discharge above and in generally parallel relation with the sides of the associated tiers, as indicated by the heavy lines 195 in Fig. 23, but with some of the discharge fanning laterally toward the center of the tier as indicated by the lighter lines 196 in Fig. 23.

It has been found that with this arrangement of nozzles, the major part of the discharge is reflected back from the opposite walls of the cabinet to provide adequate integration of all corner areas of the trays, and at the same time the arrangement of spray discharges in combination with the minor fanning portion from each nozzle creates a swirling action around the center of each tier which causes highly satisfactory distribution of the sprayed liquid over each tray.

The remainder of the water supply system and the other controls for the cabinet 160 may be similar to those for the cabinet 25 as already described, and it has been found convenient to mount them as shown on one of the end wall panels 167. These parts include the liquid circulating pump 200 and its drive motor 201, as well as a valve 202 operated by a float 203 for maintaining the proper liquid level within the pan 165 similarly to the valve 83. The inlet line for the pump 200 is shown in Fig. 22 as including a suitable strainer 205.

A temperature control and air circulating unit such as a heat pump 210 is shown as also mounted on the end wall of the cabinet, and its operation is controlled by a thermostat (not shown) suitably located within the cabinet. A time-clock 211 is shown as connected to control the operation of the pump motor 201, but the heat pump 210 may operate at any time as determined by its own thermostatic controls. It will also be noted that the door 168 is recessed at 212 to provide for receiving a suitable fluorescent tube 213 as a light source for illuminating the interior of the cabinet and the plant material therein as desired, and the connections 214 for this light are shown in Fig. 19 and may be provided with any suitable switch or timer control as desired and as explained in connection with cabinet 25.

Figures 19, 20, 21:
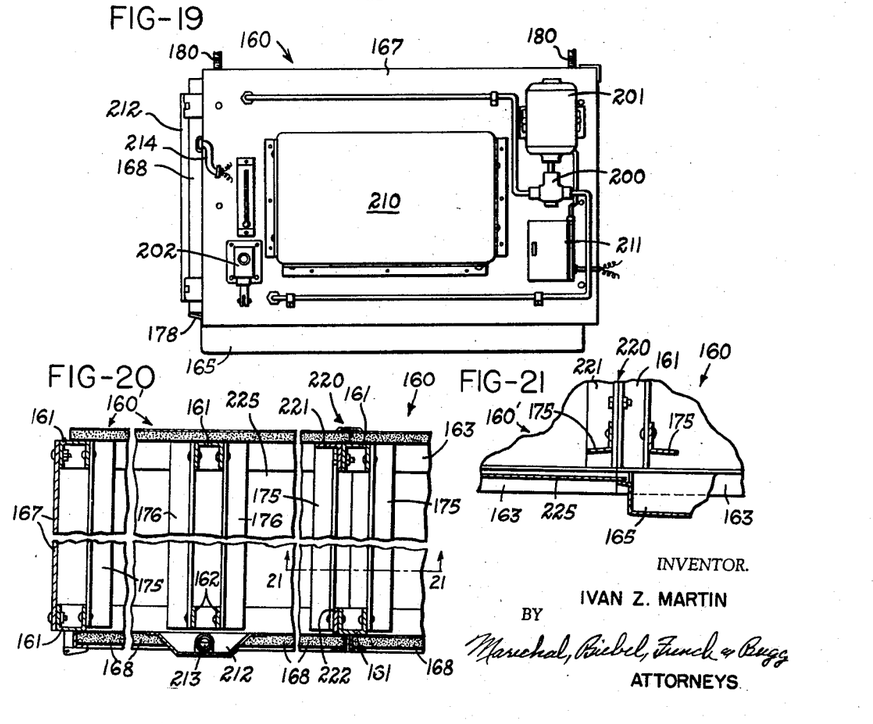
Fig. 19 is a side elevational view looking from right to left in Fig. 16.
Fig. 20 is a fragmentary plan section illustrating the assembly of a plurality of the units of Figs. 15–19.
Fig. 21 is an enlarged fragmentary section on the line 21—21 of Fig. 20.

The cabinet 160 is also particularly adapted for mounting in tandem combination with one or more similar cabinets as indicated at 160' in Figs. 20 and 21. For such tandem assemblies, it is merely necessary to remove adjacent end walls on the two cabinets and secure their corner frame members directly together as indicated at 220 in Fig. 20, and this arrangement is facilitated if the cabinet 160' is essentially identical in structure with cabinet 160 except that it includes an angle 221 or strap 222 at its corners adjacent the cabinet 160 rather than providing a channel at these points as shown for the cabinet 160. Additionally, the bottom 225 of the cabinet 160 is an inclined plate arranged as shown in Fig. 21 to drain into the pan 165 which forms the bottom of the cabinet 160, since the cabinet 160 acts as the master unit and incorporates the controls and other operating parts. The cabinet 160 would of course be provided with its own nozzle system, which may connect directly with the water supply system for the cabinet 160 as indicated at 226.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for the hydroponic growth of plants from seed, comprising walls forming a cabinet providing a growing chamber, framework means within said chamber supporting in vertically spaced tiers a plurality of trays for containing the plant material to be grown, a reservoir for liquid in the bottom of said chamber, means for supplying liquid from said reservoir to said tiers at selected intervals, means for causing unabsorbed said liquid to be drained from said trays to said reservoir, means for circulating the air within said chamber through and around said tiers, and heat exchange means for selectively heating and cooling said circulated air to provide a predetermined maintained temperature range within said chamber.

2. Apparatus for the hydroponic growth of plants from seed, comprising walls forming a cabinet providing a growing chamber, means forming a framework within said chamber supporting in vertically spaced tiers a plurality of trays for containing the plant material to be grown, a reservoir for liquid in the bottom of said chamber, means for supplying liquid from said reservoir to all of said tiers simultaneously at selected intervals, said framework including means for receiving unabsorbed said liquid from the adjacent said trays and directing such liquid back to said reservoir, means for circulating the air within said chamber through and around said tiers, and heat exchange means for selectively heating and cooling said circulating air to provide a predetermined maintained temperature range within said chamber.

3. Apparatus for the hydroponic growth of plants from seed, comprising walls forming a cabinet providing a growing chamber, means forming a framework within said chamber supporting in vertically spaced tiers a plurality of trays for containing the plant material to be grown, a reservoir for liquid in the bottom of said chamber, means for supplying liquid from said reservoir to all of said tiers simultaneously at selected intervals, said framework including means for receiving unabsorbed said liquid from said trays and delivering such liquid to said reservoir, means for circulating the air within said chamber through and around said tiers, and automatic means for maintaining a substantially constant supply of liquid in said reservoir.

4. Apparatus for the hydroponic growth of plants from seed, comprising walls forming a cabinet providing a growing chamber, framework means within said chamber supporting in vertically spaced tiers a plurality of trays for containing the plant material to be grown, a reservoir for liquid in the bottom of said chamber, a plurality of liquid supply nozzles in said chamber including at least one said nozzle associated with each said tier and located in lateral relation therewith, said nozzles being constructed and arranged to direct the majority of the liquid discharged thereby above and in generally parallel relation with the associated said tier for reflection from the opposite said wall back onto said associated tier, means for supplying liquid from said reservoir to said nozzles at selected intervals, means for causing unabsorbed said liquid to be drained from said trays to said reservoir, means for circulating air throughout said chamber, and heat exchange means for selectively heating and cooling said circulated air to provide a predetermined maintained temperature range within said chamber.

5. Apparatus for the hydroponic growth of plants from seed, comprising walls forming a cabinet providing a growing chamber, framework means within said chamber supporting in vertically spaced tiers a plurality of trays for containing the plant material to be grown, a reservoir for liquid in the bottom of said chamber, a plurality of liquid supply nozzles in said chamber including at least one said nozzle associated with each said tier and located in lateral relation therewith, said nozzles being constructed and arranged to direct the majority of the liquid discharged thereby above and in generally parallel relation with the associated said tier for reflection from the opposite said wall back onto said associated tier, means for supplying liquid from said reservoir to said nozzles at selected intervals, and means for causing unabsorbed said liquid to be drained from said trays to said reservoir.

6. Apparatus for the hydroponic growth of plants from seed, comprising walls forming a cabinet providing a growing chamber, framework means within said chamber supporting in vertically spaced tiers a plurality of trays for containing the plant material to be grown, a reservoir for liquid in the bottom of said chamber, a liquid supply pipe supported vertically adjacent said tiers, a plurality of nozzles on said pipe located one above each said tier, said nozzles being constructed and arranged to direct the majority of the liquid discharged thereby above and in generally parallel relation with the associated said tier for reflection from the opposite said wall back onto said associated tier, means for rotating said pipe through an arc sufficient to effect coverage of all of said tiers by the discharge from said nozzles, means for supplying liquid from said reservoir to said pipe at selected intervals during said rotary movement thereof, and means for causing unabsorbed said liquid to be drained from said trays to said reservoir.

7. Apparatus for the hydroponic growth of plants from seed, comprising walls forming a cabinet providing a growing chamber, framework means within said chamber supporting in vertically spaced tiers and laterally spaced sets a plurality of trays for containing the plant material to be grown, a reservoir for liquid in the bottom of said chamber, a liquid supply pipe supported vertically between said laterally spaced sets of tiers, a plurality of nozzles on said pipe located one above each said tier, said nozzles being constructed and arranged to direct the majority of the liquid discharged thereby above and in generally parallel relation with the associated said tier for reflection from the opposite said wall back onto said associated tier, means for rotating said pipe to effect coverage of all of said trays by the discharge from said nozzles, means for supplying liquid from said reservoir to said pipe at selected intervals during said rotary movement thereof, and means for causing unabsorbed said liquid to be drained from said trays to said reservoir.

8. Apparatus for the hydroponic growth of plants from seed, comprising walls forming a cabinet providing a growing chamber, framework means within said chamber supporting in vertically spaced tiers a plurality of trays for containing the plant material to be grown, a reservoir for liquid in the bottom of said chamber, a plurality of liquid supply nozzles associated with each of said tiers, means supporting one of said nozzles above each corner of each said tier with said nozzles arranged to direct the majority of the liquid discharged thereby above and in generally parallel relation with the sides of said tiers for reflection from the opposite side wall back onto said associated tier with accompanying swirling action above said tier, means for supplying liquid from said reservoir to said nozzles at selected intervals, and means for causing unabsorbed said liquid to be drained from said trays to said reservoir.

9. Apparatus for the hydroponic growth of plants from seed, comprising walls forming a cabinet providing a growing chamber, means forming a framework within said chamber supporting in vertically spaced tiers a plurality of trays for containing the plant material to be grown, a reservoir for liquid in the bottom of said chamber, means for supplying liquid from said reservoir to all of said trays simultaneously at selected intervals, said framework including opposed pairs of bars arranged in vertically spaced relation for supporting said trays in inclined relation toward the lower of each said pair of bars, a plurality of trays supported on said bars and each having drainage holes in the lower end thereof, each of said lower bars being of trough shape in section to receive liquid draining through said holes and being fixed in said framework in inclined relation to deliver said liquid to the lower end thereof, and means at said lower ends of said inclined bars for directing such liquid back to said reservoir.

10. Apparatus for the hydroponic growth of plants from seed, comprising walls forming a cabinet providing a growing chamber, means forming a framework within said chamber supporting in vertically spaced tiers a plurality of trays for containing the plant material to be grown, a reservoir for liquid in the bottom of said chamber, means for supplying liquid from said reservoir to all of said trays simultaneously at selected intervals, said framework including opposed pairs of bars arranged in vertically spaced relation for supporting said trays in inclined relation toward the lower of each said pair of bars, each of said trays having drainage holes in the lower end thereof, each of said lower bars being of trough shape in section to receive liquid draining through said holes and being fixed in said framework in inclined relation to deliver said liquid to the lower end thereof, and means at said lower ends of said inclined bars for directing such liquid back to said reservoir.

11. Apparatus for the hydroponic growth of plants from seed, comprising walls forming a cabinet providing a growing chamber, means forming a framework within said chamber supporting in vertically spaced tiers a plurality of trays for containing the plant material to be grown, a reservoir for liquid in the bottom of said chamber, means for supplying liquid from said reservoir to all of said trays simultaneously at selected intervals, said framework including opposed pairs of angle bars arranged in vertically spaced relation for supporting said trays in inclined relation toward the lower of each said pair of angle bars, each of said trays having drainage holes in the lower end thereof, each of said lower bars having the lower side thereof inclined upwardly towards said trays to form with the upper side thereof a trough for receiving liquid draining through said holes, said trays also having drainage holes in the end portions of the sides thereof overlying said lower angle bars to accelerate drainage from said trays by establishing contact between said bars and the liquid within said trays, said lower angle bars being fixed in said framework in inclined relation to deliver said liquid to the lower end thereof, and means adjacent said lower ends of said inclined bars for directing such liquid back to said reservoir.

References Cited in the file of this patent

UNITED STATES PATENTS

| | | |
|---|---|---|
| 1,046,971 | Chapin | Dec. 10, 1912 |
| 2,121,461 | Widmann | June 21, 1938 |

FOREIGN PATENTS

| | | |
|---|---|---|
| 1,066,645 | France | Jan. 20, 1954 |
| 473,279 | Great Britain | Oct. 4, 1937 |
| 744,200 | Great Britain | Feb. 1, 1956 |
| 205,449 | Switzerland | Sept. 16, 1939 |